US012608018B2

(12) United States Patent　(10) Patent No.: US 12,608,018 B2
Mitsuhata et al.　(45) Date of Patent: Apr. 21, 2026

(54) AUTONOMOUS DRIVING METHOD, WORK VEHICLE, AND AUTONOMOUS DRIVING SYSTEM

(71) Applicant: Yanmar Holdings Co., Ltd., Osaka (JP)

(72) Inventors: Tomohiro Mitsuhata, Okayama (JP); Yasunori Omori, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 94 days.

(21) Appl. No.: 18/281,766

(22) PCT Filed: Feb. 4, 2022

(86) PCT No.: PCT/JP2022/004468
§ 371 (c)(1),
(2) Date: Sep. 12, 2023

(87) PCT Pub. No.: WO2022/201901
PCT Pub. Date: Sep. 29, 2022

(65) Prior Publication Data
US 2024/0168495 A1　May 23, 2024

(30) Foreign Application Priority Data
Mar. 22, 2021　(JP) ................................. 2021-046859

(51) Int. Cl.
*G05D 1/617*　(2024.01)
*A01D 41/127*　(2006.01)
(Continued)

(52) U.S. Cl.
CPC ......... *G05D 1/617* (2024.01); *A01D 41/1278* (2013.01); *G05D 2105/15* (2024.01); *G05D 2107/21* (2024.01)

(58) Field of Classification Search
None
See application file for complete search history.

(56) References Cited

U.S. PATENT DOCUMENTS

2017/0057520 A1　3/2017　Letwin et al.
2017/0355264 A1 *　12/2017　Foster .................. G05D 1/0212
(Continued)

FOREIGN PATENT DOCUMENTS

JP　2008067617 A　3/2008
JP　2017127292 A　7/2017
(Continued)

OTHER PUBLICATIONS

Communication with European Patent Office: Application No. 22774702.9-1201, Dated on Aug. 7, 2025. Applicant Yanmar Holdings Co., Ltd.

*Primary Examiner* — Tamara L Weber
(74) *Attorney, Agent, or Firm* — Chris Mizumoto

(57) ABSTRACT

A combine is a work vehicle that autonomously travels on the basis of a preset travel route, and is provided with an autonomous travel allowance switch, which is an autonomous travel allowance operation member that allows autonomous travel, and a control device that functions as an autonomous travel control part that controls autonomous travel based on the travel route. The autonomous travel control part executes autonomous travel based on the travel route while the autonomous travel allowance switch is being operated (pressed).

10 Claims, 4 Drawing Sheets

(51) Int. Cl.
    *G05D 105/15*        (2024.01)
    *G05D 107/20*        (2024.01)

(56)               References Cited

U.S. PATENT DOCUMENTS

| | | | |
|---|---|---|---|
| 2018/0299894 | A1 | 10/2018 | Takase et al. |
| 2019/0146513 | A1 | 5/2019 | Tomita et al. |
| 2022/0121202 | A1* | 4/2022 | Lyzen ................. A01D 34/008 |

FOREIGN PATENT DOCUMENTS

| | | | |
|---|---|---|---|
| JP | 2020018236 | A | 2/2020 |
| WO | 2016017367 | A1 | 2/2016 |
| WO | 2018042853 | A1 | 3/2018 |
| WO | 2020026651 | A1 | 2/2020 |

* cited by examiner

AUTONOMOUS DRIVING METHOD, WORK VEHICLE, AND AUTONOMOUS DRIVING SYSTEM

CROSS-REFERENCE

This application is a US National Stage Application under 35 U.S.C. § 371 of International Application No. PCT/JP2022/004468 filed Feb. 4, 2022, which claims foreign priority of JP2021-046859 filed Mar. 22, 2021 and the disclosures of which are hereby incorporated by reference in their entirety.

TECHNICAL FIELD

The present invention relates to an autonomous driving method for a work vehicle that autonomously travels based on a preset travel route, a work vehicle, and an autonomous driving system.

BACKGROUND ART

Conventionally, some work vehicles, such as combine harvesters and tractors, execute the autonomous travel based on a given travel route.

For example, an autonomous driving system disclosed in Patent Literature 1 is provided with a travel control part that causes a work vehicle to autonomously travel. In an embodiment of Patent Literature 1, a user operates a wireless communication terminal thereby to give an instruction to start the autonomous travel, and thereby the tractor executes the work while traveling along the straight and turn routes.

CITATION LIST

Patent Literature

Patent Literature 1: Japanese Unexamined Patent Application Publication No. 2020-092621

DISCLOSURE OF INVENTION

Problems to be Solved by the Invention

However, in the conventional work vehicle, a worker, as the case may be, mistakenly gives the instruction for the start of the autonomous travel by simply touching a start button, which is for giving the instruction for the start of the autonomous travel, or an operation key on a touch screen, which may result in an autonomous travel not intended by the worker and a continuation of such autonomous travel.

It is an object of the present invention to provide an autonomous driving method, a work vehicle, and an autonomous travel system each capable of suppressing an unintended autonomous travel by a worker.

Means for Solving the Problems

To solve the above problem, an autonomous driving method of the present invention is an autonomous driving method of a work vehicle that executes an autonomous travel based on a preset travel route, the autonomous driving method including: an operation step that operates an autonomous travel allowance operation member which allows for the autonomous travel; and an autonomous travel control step that controls the autonomous travel which is based on the travel route, wherein the autonomous travel control step, while the autonomous travel allowance operation member is being operated, executes the autonomous travel which is based on the travel route.

Further, to solve the above problem, a work vehicle of the present invention is a work vehicle that executes an autonomous travel based on a preset travel route, the work vehicle including: an autonomous travel allowance operation member that allows for the autonomous travel; and an autonomous travel control part that controls the autonomous travel which is based on the travel route, wherein the autonomous travel control part, while the autonomous travel allowance operation member is being operated, executes the autonomous travel which is based on the travel route.

Further, to solve the above problem, an autonomous driving system of the present invention is an autonomous driving system including a work vehicle that executes an autonomous travel based on a preset travel route, the autonomous driving system including: an autonomous travel allowance operation member that allows for the autonomous travel; and an autonomous travel control part that controls the autonomous travel which is based on the travel route, wherein the autonomous travel control part, while the autonomous travel allowance operation member is being operated, executes the autonomous travel which is based on the travel route.

Effect of the Invention

According to the present invention, it is possible to provide an autonomous driving method, a work vehicle, and an autonomous driving system each capable of suppressing autonomous travel not intended by the worker.

DESCRIPTION OF EMBODIMENTS

A combine harvester 1 which is one embodiment of a work vehicle of the present invention will be described with reference to FIG. 1 and the like. The combine harvester 1, by an autonomous drive or a manual operation, travels in a farm field as a work target, and executes work such as mowing so as to execute work for harvesting crops from grain culm planted in the farm field.

The combine harvester 1 is set to a travel mode of any of a manual travel mode and an autonomous travel mode. The combine harvester 1 is so configured as to execute, when the manual travel mode is being set, the manual travel in response to a worker's maneuvering of a maneuvering part 9.

Meanwhile, the combine harvester 1 is so configured as to execute, when the autonomous travel mode is being set, the autonomous mowing travel in which the combine harvester 1 executes the autonomous mowing while autonomously traveling following a preset travel route. For example, the combine harvester 1 executes the autonomous mowing travel of a travel pattern such as a reciprocating mowing for making reciprocating movements in plural strokes in the farm field's area having yet-to-be-mowed grain culm (hereinafter, referred to as a "yet-to-be-mowed area"), or a turn mowing in which the circumferential trip of the stroke along an inner periphery of the yet-to-be-mowed area is shifted to the center side and is repeated.

Figure 1:
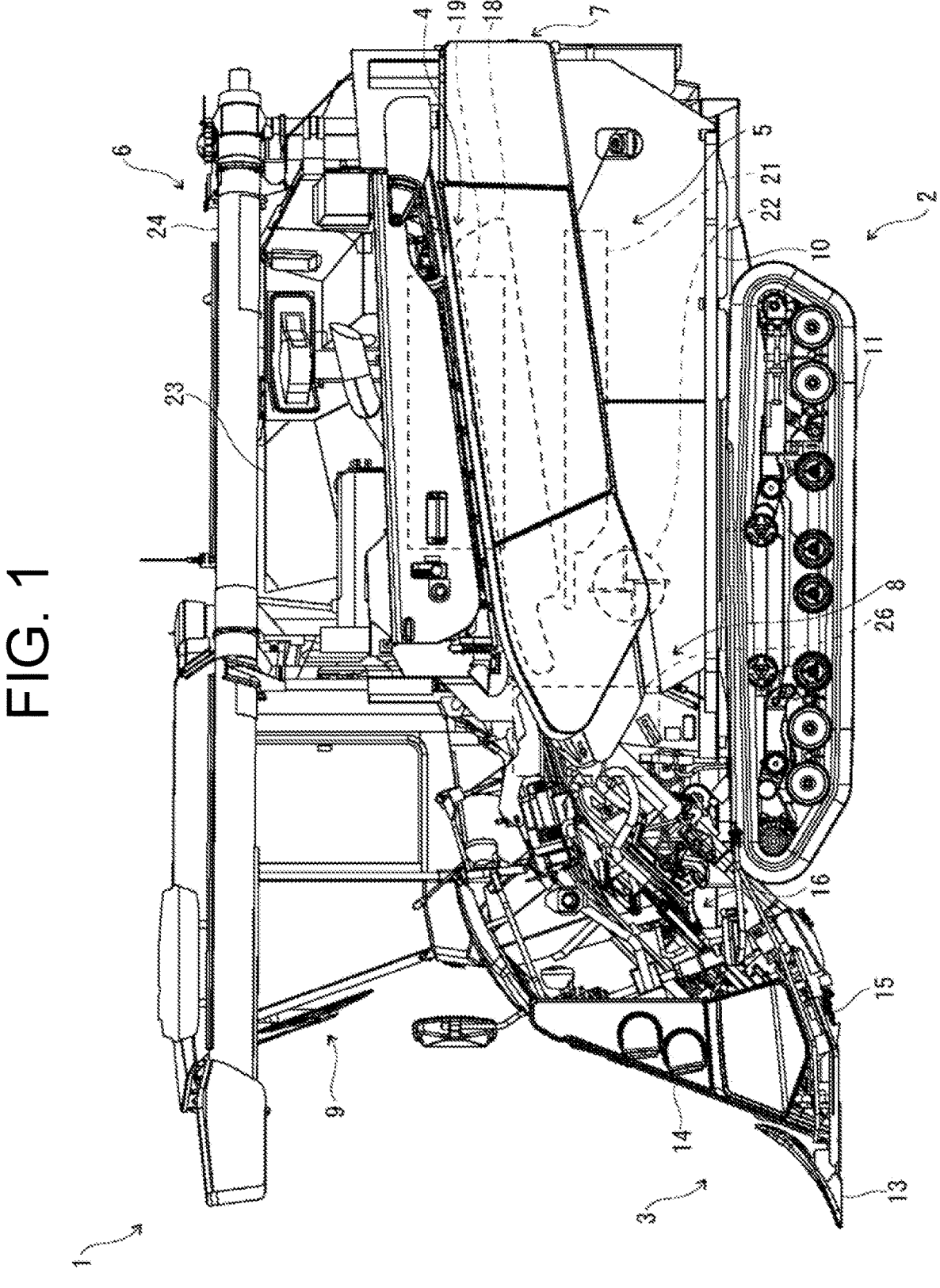
FIG. 1 is a side view of a combine harvester according to one embodiment of a work vehicle of the present invention.

As shown in FIG. 1, the combine harvester 1 includes a travel part 2, a mowing part 3, a threshing part 4, a sorting part 5, a reserving part 6, a discharged-straw processing part 7, a powering part 8, and the maneuvering part 9, and is configured as a so-called self-threshing type combine harvester. The combine harvester 1, while traveling by the travel part 2, threshes, by the threshing part 4, the grain culm mowed by the mowing part 3, sorts the grain by the sorting part 5, and stores the sorted grain in the reserving part 6. The combine harvester 1 causes the discharged-straw processing part 7 to process a discharged straw after the threshing. By power supplied by the powering part 8, the combine harvester 1 drives the travel part 2, the mowing part 3, the threshing part 4, the sorting part 5, the reserving part 6, and the discharged-straw processing part 7.

The travel part 2 is provided below a machine body frame 10, and includes a pair of right and left crawler-type travel devices 11 and a transmission (not shown). The travel part 2, by the power (for example, rotary power) transmitted from an engine 26 of the powering part 8, rotates the crawler of the crawler-type travel device 11, thereby to cause the combine harvester 1 to travel in the forward and backward directions or to turn to the right and left directions. The transmission sends the power (rotary power) of the powering part 8 to the crawler-type travel device 11, and also is capable of shifting the rotary power.

The mowing part 3 is provided in front of the travel part 2 and executes mowing work of rows within the maximum number of mowing rows, and a mowing width is determined according to the number of rows targeted for the mowing work. The mowing part 3 includes a divider 13, a raising device 14, a cutting device 15, and a conveying device 16. The divider 13 divides grasses of the grain culm of the farm field every one row, and guides, to the raising device 14, the grain culm of the given number of rows equal to or smaller than the maximum number of mowing rows. The raising device 14 raises the grain culm guided by the divider 13. The cutting device 15 cuts the grain culm raised by the raising device 14. To the threshing part 4, the conveying device 16 conveys the grain culm cut by the cutting device 15.

The threshing part 4 is provided behind the mowing part 3. The threshing part 4 includes a feed chain 18 and a handling body 19. The feed chain 18 conveys, for threshing, the grain culm conveyed from the conveying device 16 of the mowing part 3, and further conveys, to the discharged-straw processing part 7, the grain culm after the threshing, that is, the discharged straw. The handling body 19 threshes the grain culm conveyed by the feed chain 18.

The sorting part 5 is provided below the threshing part 4. The sorting part 5 includes a swing sorting device 21, a wind sorting device 22, a grain conveying device (not shown), and a straw waste discharging device (not shown). The swing sorting device 21 sifts the threshed matters dropped from the threshing part 4, thereby to sort the threshed matter into the grain and the straw waste, etc. By air blow, the wind sorting device 22 further sorts the threshed matters, which are sorted by the swing sorting device 21, into the grain, the straw waste, etc. To the reserving part 6, the grain conveying device conveys the grains sorted by the swing sorting device

21 and the wind sorting device 22. To the outside of the machine, the straw waste discharging device discharges the straw waste and the like sorted by the swing sorting device 21 and the wind sorting device 22.

The reserving part 6 is provided on the right side of the threshing part 4. The reserving part 6 includes a grain tank 23 and a discharge device 24. The grain tank 23 stores the grain conveyed from the sorting part 5. The discharge device 24 includes an auger or the like and executes the discharging work of the grains, thus discharging, to any place, the grains stored in the grain tank 23. The discharge device 24 executes the discharging work autonomously under the control by a control device 50 (see FIG. 2) or manually according to an operation of the maneuvering part 9.

The discharged-straw processing part 7 is provided behind the threshing part 4. The discharged-straw processing part 7 includes a discharged-straw conveying device (not shown) and a discharged-straw cutting device (not shown). For example; to the outside of the machine (behind or below the combine harvester 1, for example), the discharged-straw processing part 7 discharges, by the discharged straw conveying device, the discharged straw, as it is, conveyed from the feed chain 18 of the threshing part 4. Or, the discharged-straw processing part 7 conveys, by the discharged straw conveying device, the discharged straw to the discharged straw cutting device, and after cutting the discharged straw by the discharged straw cutting device, discharges the discharged straw to the outside of the machine (right side behind the combine harvester 1, for example).

The powering part 8 is provided above the travel part 2 and in front of the reserving part 6. The powering part 8 includes the engine 26 that generates rotary power. To the travel part 2, the mowing part 3, the threshing part 4, the sorting part 5, the reserving part 6, and the discharged-straw processing part 7, the powering part 8 sends the rotary power generated by the engine 26. Further, the combine harvester 1 includes a fuel tank (not shown) to tank a fuel to be supplied to the engine 26 of the powering part 8.

Figure 3:
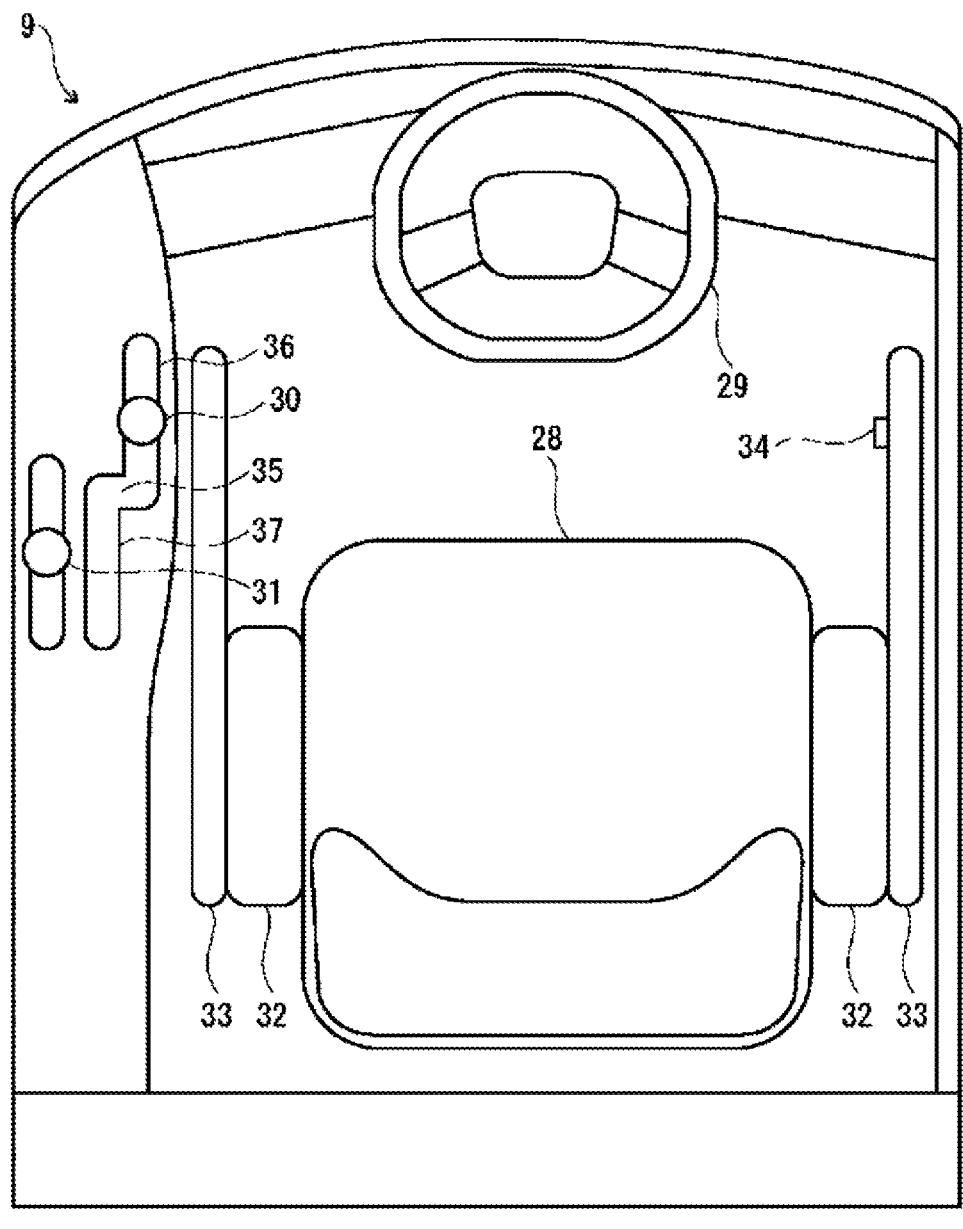
FIG. 3 is a plan view of a maneuvering part of the combine harvester according to the one embodiment of the work vehicle of the present invention.

The maneuvering part 9 is provided above the powering part 8. As shown in FIG. 3; around a drive seat 28, the maneuvering part 9 includes operation tools for maneuvering the travel of the combine harvester 1, such as a steering wheel 29, a main speed-change lever 30, and an auxiliary speed-change lever 31. Further, the maneuvering part 9 includes a mechanism for operates the mowing work by the mowing part 3, the threshing work by the threshing part 4, and the discharging work by the discharge device 24 of the reserving part 6.

The drive seat 28 is a seat on which the worker sits, and is provided, for example, on the right part of the combine harvester 1. An armrest 32 is provided on the right side of the drive seat 28, and a handrail part 33 is provided in front of the armrest 32. An autonomous travel allowance switch 34, which is an example of an autonomous travel allowance operation member, is provided on the handrail part 33; the autonomous travel allowance switch 34 is placed, for example, in the handrail part 33's position where a finger of the right hand hangs in a state of the worker, who sits on the drive seat 28, having his/her right arm on the armrest 32. For example, the autonomous travel allowance switch 34 includes a press button, which is turned on when being operated (pressed), that is, pushed, and is turned off when the operation (pressing) is canceled, that is, not pushed.

The autonomous travel allowance switch 34, while being pressed in the case of setting the autonomous travel mode, allows for the autonomous travel which is based on the travel route. In other words; even when the autonomous travel mode is being set, the autonomous travel which is based on the travel route is not allowed for unless the autonomous travel allowance switch 34 is pressed. Details of the autonomous travel action of combine harvester 1, which action is in response to the operation of the autonomous travel allowance switch 34, are to be described below.

To the travel part 2, the steering wheel 29 sends a turning operation by the worker, thereby to change a progressing direction of the combine harvester 1, that is, operates the steering of the combine harvester 1. When the manual travel mode is being set, for example, the travel part 2 ordinarily receives e the worker's steering operation of the steering wheel 29. Meanwhile, when the autonomous travel mode is being set, the travel part 2 does not receive the worker's steering operation of the steering wheel 29, but the combine harvester 1, when the steering wheel 29 is operated, switches the travel mode from the autonomous travel mode to the manual travel mode. The steering wheel 29 has a margin of about ±5 degrees in a rotary direction, and is so configured that any operation within this margin is not sent to the travel part 2. Further, the margin of the steering wheel 29 is not limited to ±5 degrees, and can be manually adjusted.

According to the operation by the worker, the main speed-change lever 30 and the auxiliary speed-change lever 31 switch a set speed of the travel of the combine harvester 1. When the manual travel mode is being set, for example, the main speed-change lever 30, when being in a neutral position 35 in the center, stops the combine harvester 1. Further, the main speed-change lever 30, when tilted to a forward speed-change area 36 on a front side of the neutral position 35, transmits the forward travel operation of the combine harvester 1 to the travel part 2, and sets, to the travel part 2, a forward set speed which is in response to the forward-backward position of the main speed-change lever 30 in the forward speed-change area 36 extending in the forward-backward direction. The main speed-change lever 30 positioned in the forward speed-change area 36, when tilted from the neutral side to the front side, increases the forward set speed; meanwhile, when tilted from forward to the neutral side, decreases the forward set speed.

Meanwhile, the main speed-change lever 30, when tilted to a backward speed-change area 37 behind the neutral position 35, transmits the backward travel operation of the combine harvester 1 to the travel part 2, and set, to the travel part 2, a backward set speed which is in response to the forward-backward position of the main speed-change lever 30 in the backward speed-change area 37 extending in the forward-backward direction. The main speed-change lever 30 positioned in the backward speed-change area 37, when tilted from the neutral side to the back side, increases the backward set speed; meanwhile, when tilted from the back side to the neutral side, decreases the backward set speed.

Further, when the autonomous travel mode is set thereby, for the combine harvester 1, to execute the autonomous travel, the main speed-change lever 30 is positioned in the forward speed-change area 36. When the autonomous travel mode is being set, it may be one of the autonomous travel starting conditions of the combine harvester 1 that the main speed-change lever 30 is positioned in the forward speed-change area 36. In the forward autonomous travel; the forward set speed, which is in response to the main speed-change lever 30's position in the forward-backward direction, is set to the travel part 2; for example, during the autonomous travel, when the main speed-change lever 30 is tilted from the neutral side to the front side, the forward set speed is increased, meanwhile, when the main speed-change lever 30 is tilted from forward to the neutral side, the forward set speed is decreased. Further, in the autonomous backward travel, the constant backward set speed is set for the travel part 2, regardless of the forward-backward position of the main speed-change lever 30.

Figure 2:
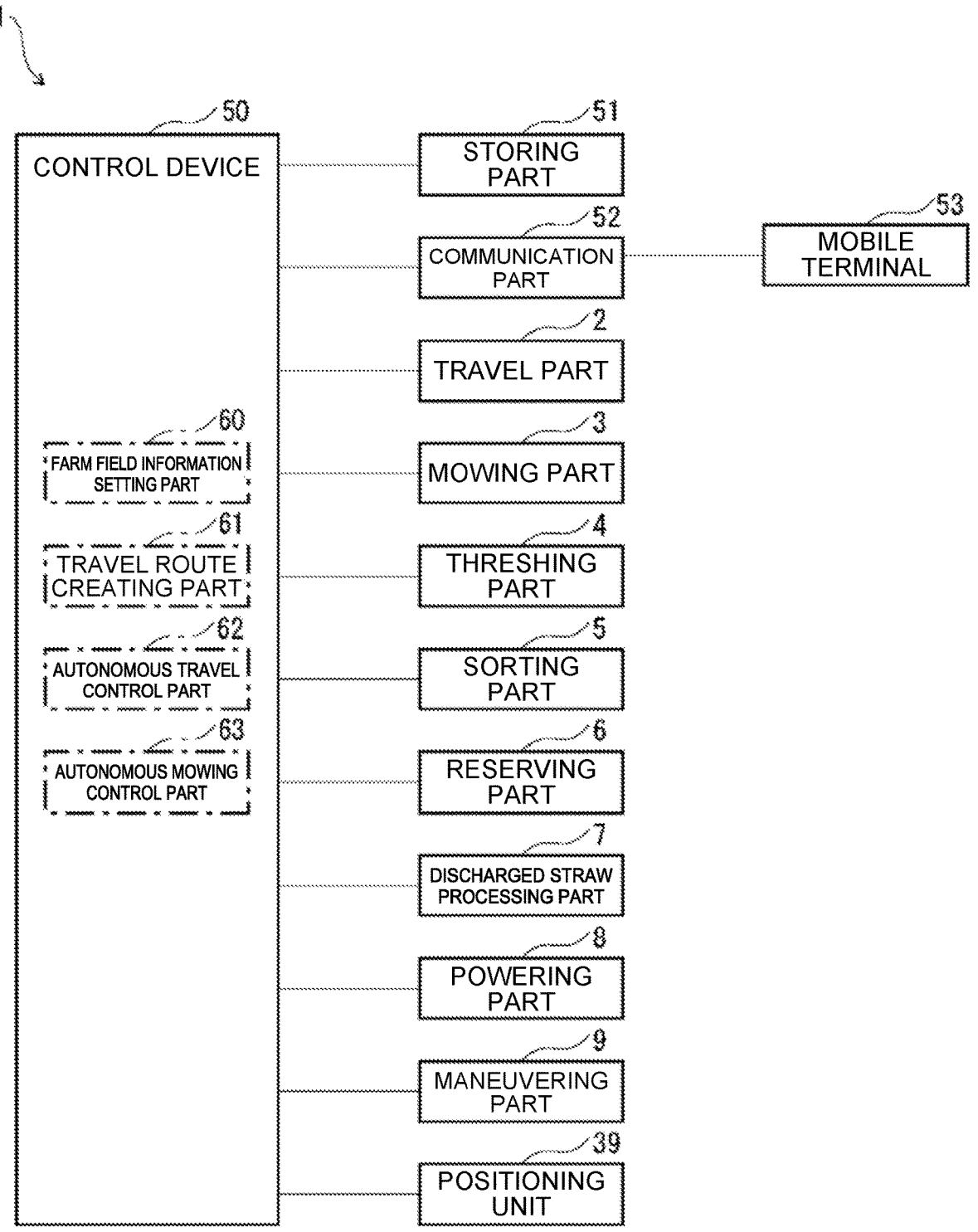
FIG. 2 is a block diagram of the combine harvester according to the one embodiment of the work vehicle of the present invention.

As shown in FIG. 2, the combine harvester 1 includes a positioning unit 39 which uses a satellite positioning system such as GPS thereby to acquire position information of the combine harvester 1. The positioning unit 39 receives a positioning signal from a positioning satellite via a positioning antenna, and based on the positioning signal, acquires position information of the positioning unit 39, that is, the position information of the combine harvester 1.

It is noted that the combine harvester 1 may be so configured as to be communicable with a base station (not shown) placed at a ridge or the like around the farm field. The base station receives the positioning signal from the positioning satellite via the positioning antenna, and, based on the positioning signal, acquires the position information of the base station. To the combine harvester 1 (for example, positioning unit 39), the base station sends correction information which is based on position information of the base station. The combine harvester 1 (for example, positioning unit 39) receives the correction information from the base station, and, based on the correction information, corrects position information of the positioning unit 39, that is, the position information of the combine harvester 1.

Then, the control device 50 of the combine harvester 1 will be described with reference to FIG. 2. The control device 50 includes a computer such as a CPU, and is connected to a storing part 51 such as a ROM, a RAM, a hard disk drive and a flash memory, and to a communication part 52 that communicates with an external device. The storing part 51 stores programs and data for controlling various components and various functions of the combine harvester 1, and the control device 50 executes an arithmetic operation based on the programs and data stored in the storing part 51 thereby to control various components and various functions. The control device 50 controls the positioning unit 39, for example, thereby to acquire the position information of the combine harvester 1.

The storing part 51 stores, for example, farm field information of a farm field as the work target of the combine harvester 1. The farm field information includes shape, size, and position information (coordinates, etc.) of farm field ends included in the outer periphery of the farm field, as well as shape, size, and position information (coordinates, etc.) of the yet-to-be-mowed area of the farm field.

Via a wireless communication antenna, the communication part 52 is capable of wirelessly communicating with an external device such as a mobile terminal 53 possessed by the worker. The control device 50 controls the communication part 52 thereby to wirelessly communicate with the mobile terminal 53, thereby to send and receive various information to and from the mobile terminal 53.

The mobile terminal 53, which is one of the components of the combine harvester 1 and is a terminal that can remotely operate the combine harvester 1, includes, for example, a tablet terminal provided with a touch screen, a laptop personal computer, or the like. For example, the mobile terminal 53 displays, on the touch screen, a screen (for example, home screen or mode setting screen) on which any of the manual travel mode and autonomous travel mode of the combine harvester 1 can be set, and sends, to the combine harvester 1, the travel mode set according to the worker's operation. Further, the maneuvering part 9 may be provided with an operation device similar to the mobile terminal 53.

Regarding the farm field information related to the farm field as the work target, the mobile terminal 53 is so configured as to receive an inputting operation by a touching operation and the like on the touch screen, and displays, for example, a farm field information setting screen where the farm field information can be set. On the farm field information setting screen, the mobile terminal 53, while displaying the farm field map which is based on the farm field information, may display the travel route of the combine harvester 1 on a field map so that the progressing direction can be seen. To the combine harvester 1, the mobile terminal 53 sends the farm field information set on the farm field information setting screen.

The mobile terminal 53 has a function to receive a selection of the travel pattern of the autonomous mowing travel of the combine harvester 1; when creating the travel route of the autonomous mowing travel, the mobile terminal 53 displays, on the touch screen, a screen (for example, travel selection screen) for selecting the travel pattern of the reciprocating mowing or the turn mowing. To the combine harvester 1, the mobile terminal 53 sends the travel pattern (the reciprocating mowing or the turn mowing) input according to the worker's operation, thereby to give an instruction to create the travel route.

Executing the program stored in the storing part 51, the control device 50 operates as a farm field information setting part 60, a travel route creating part 61, an autonomous travel control part 62, and an autonomous mowing control part 63. Further, the travel route creating part 61, the autonomous travel control part 62, and the autonomous mowing control part 63 realize, in the autonomous driving method according to the present invention, a travel route creating step, an autonomous travel control step, and an autonomous mowing control step, respectively. Further, the autonomous travel allowance switch 34 functions as a maneuvering part for operating whether or not to allow for the autonomous travel, and realizes the operation step of the autonomous driving method according to the present invention.

The farm field information setting part 60 autonomously or manually sets the farm field information related to the farm field as the work target, and stores the above information in the storing part 51. For example, the farm field information setting part 60 manually sets the farm field information in response to the operation to input the farm field information to the farm field information setting screen of the mobile terminal 53. Or, through a communication with a server (not shown), the farm field information setting part 60 may receive the farm field information stored in the server and autonomously set the farm field information. Further, in the farm field information setting part 60, the farm field information received from the server may be made editable by the farm field information setting screen of the mobile terminal 53.

Further, in another example, the farm field information setting part 60 may acquire a farm field image photographing the farm field as the work target and set the farm field information based on a result of analyzing the farm field image. Further, the farm field information setting part 60 may acquire more accurate field information by taking a consistency among the farm field information set according to the operation of the mobile terminal 53, the farm field information received from the server, and the farm field information analyzed from the farm field image.

The farm field image may be taken by a machine body camera provided in the combine harvester 1, the image taken by a fixed camera provided in the base station may be received by the communication part 52, the image taken by a mobile camera provided in the mobile terminal 53 may be received by the communication part 52, or the image taken by a helicopter shooting camera provided in a helicopter shooting device such as a drone may be received by the communication part 52. The farm field information setting part 60 may analyze the farm field information from the farm field image of one of the machine body camera, the fixed camera, the portable camera, and the helicopter shooting camera, or may analyze the farm field information from farm field images of two or more cameras. Further, the control device 50 may cause a monitor of the maneuvering part 9 to display the farm field image taken by the machine body camera, the fixed camera, the mobile camera or the helicopter shooting camera, or cause the monitor of the mobile terminal 53 to display the farm field image sent to the mobile terminal 53.

The travel route creating part 61 creates the travel route to be referred to for the combine harvester 1 to execute the autonomous travel and the autonomous mowing (autonomous mowing travel) by the autonomous driving in the farm field, and stores the travel route in the storing part 51. The travel route includes not only the travel setting related to the autonomous travel, but also any work setting on any work such as the autonomous mowing. The travel setting includes, in addition to a travel position in the farm field, the progressing direction (steering direction and forwarding or backing) at each travel position. The work setting includes any information about the operation or stop of the mowing in each travel position, the mowing speed and mowing height, the number of mowing rows, and any other work.

The travel route creating part 61 linearly sets, to the yet-to-be-mowed area in the farm field, the work stroke for mowing while traveling, and combine a plurality of linear strokes thereby to set the travel route. The travel route creating part 61 generates the travel route that is in response to the travel pattern (reciprocating mowing or turn mowing) selected in accordance with the operation of the mobile terminal 53 or the like. For example, the travel route creating part 61 creates a travel route of the turn mowing in which the circumferential trip of the stroke along the inner periphery of the yet-to-be-mowed area is shifted to the center side and is repeated, or the stroke of the reciprocating mowing for reciprocating in plural strokes in the yet-to-be-mowed area. Further, in the series of travel routes including the plural linear strokes, the travel route creating part 61 sets a start position for starting the autonomous mowing travel and an end position for ending the autonomous mowing travel.

When the autonomous travel mode is being set, the autonomous travel control part 62 controls the powering part 8 and the travel part 2 based on the travel setting of the travel route created by the travel route creating part 61, thereby to cause the autonomous travel, which is in response to the travel route, to be executed. Further, the combine harvester 1 may be provided with a gyro sensor and an orientation sensor thereby to acquire the displacement information and orientation information of the combine harvester 1, and the autonomous travel control part 62 may adjust the autonomous travel of the combine harvester 1 based on the displacement information and the orientation information.

When the steering wheel 29 is operated during the execution of the autonomous travel, the autonomous travel control part 62 switches the travel mode from the autonomous travel mode to the manual travel mode. Further, the autonomous travel control part 62 sets, as the set speed of the autonomous travel, the forward set speed or the constant backward set speed which are in response to the forward-backward position of the main speed-change lever 30; meanwhile, when the main speed-change lever 30 is operated during the execution the forward autonomous travel, the autonomous travel control part 62 changes the set speed of the autonomous travel in response to the position of the main speed-change lever 30. For example; during the autonomous travel, when the main speed-change lever 30, which is positioned in the forward speed-change area 36, is tilted forward from the neutral side, the autonomous travel control part 62 increases the forward set speed regardless of the forward speed set to the travel route; meanwhile, when the main speed-change lever 30 is tilted from forward to the neutral side, the autonomous travel control part 62 decreases the forward set speed regardless of the forward set speed set to the travel route.

When the autonomous travel mode is being set, the autonomous mowing control part 63 controls the powering part 8 and the mowing part 3 based on the work setting of the travel route created by the travel route creating part 61, thereby to cause the autonomous mowing, which is in response to the travel route, to be executed. The autonomous mowing control part 63 so controls that the mowing part 3 autonomously mows the yet-to-be-mowed grain culm on the travel route. Further, along with the autonomous mowing, the autonomous mowing control part 63 controls the threshing part 4, the sorting part 5, the reserving part 6 and the discharged-straw processing part 7, thereby to cause the above respective parts to autonomously execute threshing of the grain culm after the mowing, sorting of the grains and straw waste after the threshing, storing of grains after the sorting, and processing of the straw waste after the threshing.

Figure 4:
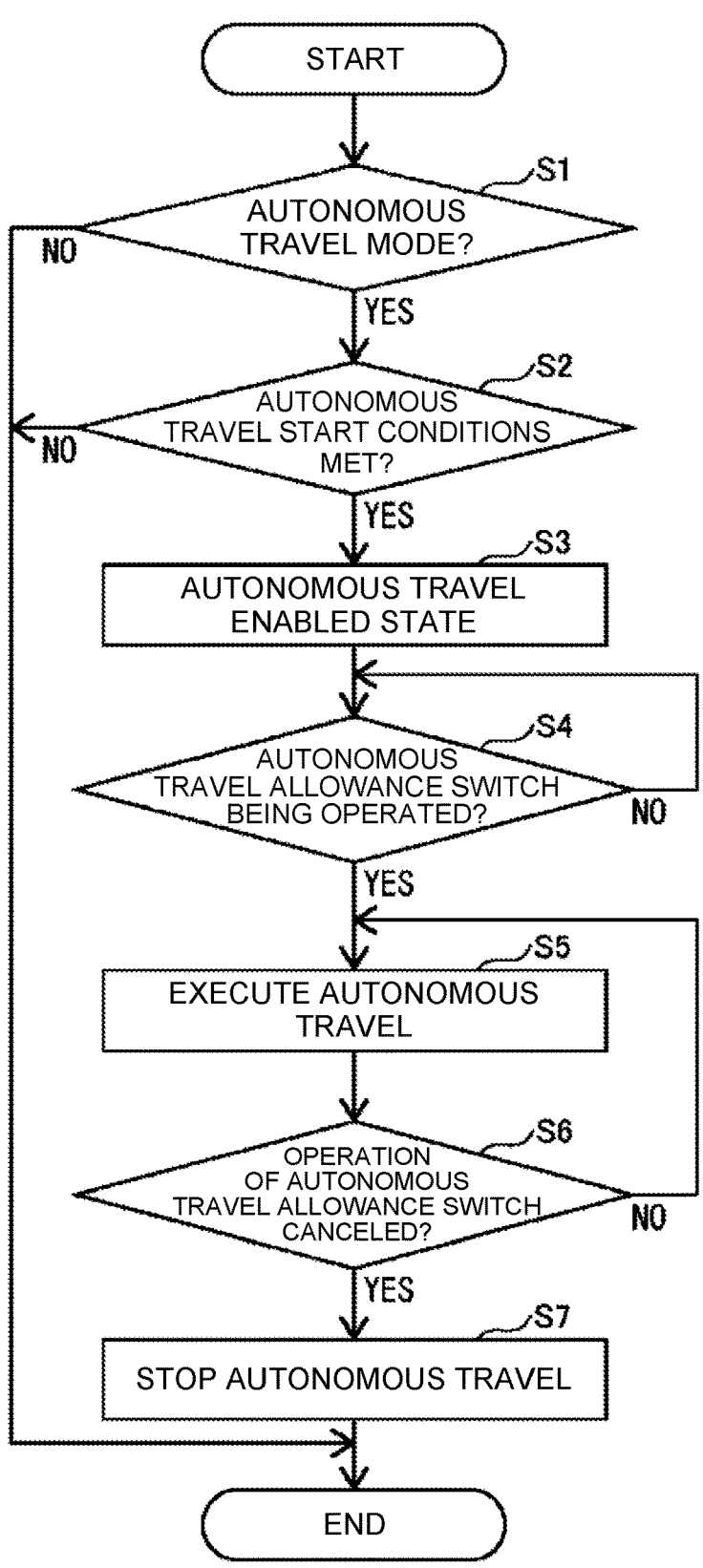
FIG. 4 is a flowchart of an autonomous travel action of the combine harvester according to the one embodiment of the work vehicle of the present invention.

In particular, the autonomous travel control part 62 controls the autonomous travel action of the combine harvester 1 which action is in response to the operation of the autonomous travel allowance switch 34. The autonomous travel action of the combine harvester 1 is to be described with reference to a flowchart in FIG. 4. When the autonomous travel mode is being set (step S1 Yes), and the combine harvester 1 meets various autonomous travel start conditions (step S2 Yes), the autonomous travel control part 62 accomplishes a state of capable of starting the autonomous travel, that is, an autonomous travel enabled state (step S3). Further, when the autonomous travel mode is not being set (step S1: No) or when the autonomous travel start conditions are not met (step S2: No), the autonomous travel action is not executed.

Then, the autonomous travel control part 62, in the autonomous travel enabled state, when the autonomous travel allowance switch 34 is being operated (pressed) (step S4 Yes), allows for the autonomous travel, executing the autonomous travel (step S5). Meanwhile, the autonomous travel control part 62, in the autonomous travel enabled state, when the autonomous travel allowance switch 34 is not being operated (pressed) (step S4: No), does not allow for the autonomous travel, not executing the autonomous travel. When the autonomous travel allowance switch 34 is being pressed and the autonomous travel is being executed, canceling the pressing of the autonomous travel allowance switch 34 (step S6 Yes) causes the autonomous travel control part 62 to stop (temporarily suspend) the autonomous travel (step S7). Further, when the pressing of the autonomous travel allowance switch 34 is canceled and the autonomous travel is stopped, pressing again the autonomous travel allowance switch 34 causes the autonomous travel control part 62 to restart the autonomous travel. When the pressing of the autonomous travel allowance switch 34 is canceled and the autonomous travel is stopped, the autonomous travel control part 62 may move to step S1, or to step S4 for waiting for the operation of the autonomous travel allowance switch 34 while storing the state of canceling the pressing of the autonomous travel allowance switch 34.

The autonomous travel control part 62, in the autonomous travel enabled state, should inform the worker, through the screen display of the monitor of the maneuvering part 9 or the mobile terminal 53, that the autonomous travel starting conditions are met and that autonomous travel is to be executed by operating the autonomous travel allowance switch 34. Further, the autonomous travel allowance switch 34 may be provided with an LED, for example, and may be so configured as to change the coloration of the LED between a case where the combine harvester 1 meets various autonomous travel start conditions and the autonomous travel control part 62 is in the autonomous travel enabled state, and another case.

For example, the autonomous travel control part 62, after the pressing of the autonomous travel allowance switch 34 is canceled, may continue the autonomous travel for a given duration time or duration distance, and then may stop the autonomous travel. In this case, the autonomous travel control part 62 may set a speed lower than the forward set speed or the constant backward set speed, which is in response to the position of the main speed-change lever 30, thereby to continue the autonomous travel, or may gradually decrease the set speed until the autonomous travel is stopped. Further, even while the autonomous travel for the given duration time or duration distance is continued, the autonomous travel control part 62 may immediately stop the autonomous travel in response to the operation of a vehicle-stop button provided for the maneuvering part 9 or mobile terminal 53 or in response to the speed-decreasing operation of the main speed-change lever 30.

Or, the autonomous travel control part 62, when the pressing of the autonomous travel allowance switch 34 is canceled, may immediately stop the autonomous travel. Further, the autonomous travel control part 62 may inform the worker, by voice output or by the screen display of the monitor of the maneuvering part 9 or mobile terminal 53, that the pressing of the autonomous travel allowance switch 34 has been canceled and the speed is decreased, or that the autonomous travel will stop after an elapse of the given duration time or duration distance.

When the autonomous travel is continued after the pressing of the autonomous travel allowance switch 34 is canceled, the autonomous travel control part 62, even if the main speed-change lever 30 is operated thereby to have increased the set speed, does not reflect the speed-increasing operation on the set speed. In this case, the autonomous travel control part 62, when the autonomous travel allowance switch 34 is pressed again thereby to restart the autonomous travel, reflects the operation of increasing the set speed which operation is seen when the pressing of the autonomous travel allowance switch 34 is canceled.

The autonomous travel control part 62 shortens, at the time of the backward travel compared to the forward travel, the given duration time or duration distance for continuing the autonomous travel after the pressing of the autonomous travel allowance switch 34 is canceled, or sets the given duration time or duration distance to zero at the time of the backward travel. In other words, the autonomous travel control part 62 should set the duration time for the backward travel shorter than the duration time for the forward travel, and preferably, if the pressing of the autonomous travel allowance switch 34 is canceled during the backward autonomous travel, should immediately stop the autonomous travel without continuing the same.

When, during the period between the cancellation of the pressing of the autonomous travel allowance switch 34 and the stopping of the autonomous travel, that is, during the given duration time or duration distance for continuing the autonomous travel, the maneuvering part 9 or the mobile terminal 53 are operated thereby to change the drive conditions of the combine harvester 1 (for example, the set speed or steering direction of the travel, the mowing height, etc.), the autonomous travel control part 62 may extend the duration time or duration distance, or reset the count of the duration time or distance. The operation to change the drive conditions during when the pressing of the autonomous travel allowance switch 34 is canceled may be reflected during the duration of the autonomous travel, or may be reflected when the autonomous travel allowance switch 34 is pressed again.

Further, the extension of the duration or the duration distance may be the same as the initial duration or the initial duration distance; for example, when the initial duration time is 5 seconds and the main speed-change lever 30 is operated within 5 seconds after the pressing of the autonomous travel allowance switch 34 is canceled, the duration time is extended by 5 seconds to be set to 10 seconds. Further, if another operation is executed within 10 seconds after the pressing of the autonomous travel allowance switch 34 is canceled, the duration time is extended by 5 seconds to be set to 15 seconds.

Or, instead of extending the duration time or duration distance, the autonomous travel control part 62 may prohibit the stop of the autonomous travel, when, during the given duration time or duration distance after the pressing of the autonomous travel allowance switch 34 is canceled, the operation to change the drive conditions of the combine harvester 1 is executed by operating the maneuvering part 9 or the mobile terminal 53.

Further, when the autonomous travel is being continued after the pressing of the autonomous travel allowance switch 34 is canceled, the autonomous travel control part 62 may stop the autonomous travel if the forward or backward section along the travel route ends and a turn section is entered.

As described above, according to the present embodiment, the combine harvester 1, which is the example of the work vehicle, is a work vehicle that executes the autonomous travel based on the preset travel route, and includes the autonomous travel allowance switch 34, which is an example of an autonomous travel allowance operation member to allow for the autonomous travel, and the control device 50 that functions as the autonomous travel control part 62 that controls the autonomous travel which is based on the travel route. The autonomous travel control part 62, while the autonomous travel allowance switch 34 is being operated (pressed), executes the autonomous travel which is based on the travel route.

This allows the combine harvester 1 to execute, while the worker is operating (pressing) the autonomous travel allowance switch 34, the autonomous travel which is based on the travel route, so that the autonomous travel is not continued simply by the worker mistakenly touching the autonomous travel allowance switch 34, thus making it possible to suppress autonomous travel not intended by the worker.

In the above embodiment, the example has been described in which the autonomous travel allowance switch 34 is turned on when being pressed, and the autonomous travel control part 62 executes the autonomous travel when the autonomous travel allowance switch 34 is being pressed; the present invention is, however, not limited to this example. For example, in another example; when the autonomous travel mode is being set and the combine harvester 1 meets various autonomous travel start conditions, that is, in the autonomous travel enabled state, and if the combine harvester 1 is on the route of the forward autonomous travel, the autonomous travel control part 62 may execute the autonomous travel regardless of the pressing operation of the autonomous travel allowance switch 34. Meanwhile, in the autonomous travel enabled state, when the combine harvester 1 is on the route that is more dangerous than the forward autonomous travel (for example, a backward autonomous travel route, etc.), the autonomous travel control part 62, if the autonomous travel is allowed for when the autonomous travel allowance switch 34 is being pressed, may execute the autonomous travel.

In the above embodiments, the example has been described in which the worker, when operating (pressing) the autonomous travel allowance switch 34, turns on the autonomous travel allowance switch 34, causing the autonomous travel control part 62 to execute the autonomous travel; the present invention is, however, not limited to this example. For example, in the other example, the autonomous travel allowance switch 34 may be so configured that pressing and holding the autonomous travel allowance switch 34 for a given time (for example, 5 seconds) or more causes the autonomous travel allowance switch 34 to be put in such a state (pressed-locked) as to remain operated (pressed) even after being released. In this case, operating (pressing) again the autonomous travel allowance switch 34 cancels the pressed-locked state.

When the autonomous travel allowance switch 34 is in the pressed-locked state, the autonomous travel control part 62 will continuously execute the autonomous travel; when the route for executing the autonomous travel enters the turn section or enters from the forward section to the backward section, however, the pressed-locked state may be kept, or the pressed-locked state may be canceled thereby to stop the autonomous travel. Further, the autonomous travel allowance switch 34 may be so enabled as to switch to the pressed-locked state in the case of the forward autonomous travel; meanwhile, may be prohibited from switching to the pressed-locked state in the case of the backward autonomous travel.

In the combine harvester 1 of the present embodiment; when the autonomous travel allowance switch 34 is being pressed and the autonomous travel is being executed at the given set speed, and if the pressing of the autonomous travel allowance switch 34 is canceled, the autonomous travel control part 62 continues the autonomous travel at the speed lower than the set speed.

As a result, even when the worker releases the autonomous travel allowance switch 34, the combine harvester 1 continues the autonomous travel at the speed lower than that seen when the autonomous travel allowance switch 34 is being pressed, thus allowing the worker to calmly execute the operation such as changing drive conditions, without stopping the autonomous travel.

In the combine harvester 1 of the present embodiment; when the autonomous travel allowance switch 34 is being pressed and the autonomous travel is being executed at the given set speed, and if the pressing of the autonomous travel allowance switch 34 is canceled and the set speed is increased, the autonomous travel control part 62 does not reflect the speed-increasing operation on the set speed, and after the autonomous travel allowance switch 34 is pressed again, reflects the speed-increasing operation on the set speed.

This means that even if the worker, during the releasing of the autonomous travel allowance switch 34, should increase or decrease the set speed with the main speed-change lever 30, etc., the travel speed of the combine harvester 1 is not increased or decreased, thus allowing the worker to calmly change the drive conditions, etc., without stopping the autonomous travel.

In the combine harvester 1 of the present embodiment, when the autonomous travel allowance switch 34 is being pressed and the autonomous travel is being executed at the given set speed, and if the pressing of the autonomous travel allowance switch 34 is canceled, the autonomous travel control part 62 stops the autonomous travel after an elapse of the given duration time.

This allows the combine harvester 1 to stop after an elapse of the given time after the worker released the autonomous travel allowance switch 34, thus making it possible to suppress the autonomous travel, which is not intended by the worker, from continuing.

In the combine harvester 1 of the present embodiment; when the operation to change the drive conditions is executed before the pressing of the autonomous travel allowance switch 34 is canceled and the autonomous travel is stopped, the autonomous travel control part 62 extends the duration time.

This allows the autonomous travel of combine harvester 1, which travel is seen while the worker releases the autonomous travel allowance switch 34, to be extended for a longer duration time if the worker changes the drive conditions, thus making it possible to suppress the worker, in the process of changing the drive conditions, from unintentionally stopping the combine harvester 1.

In the combine harvester 1 of the present embodiment, the autonomous travel control part 62 sets the duration time for the backward travel to be shorter than the duration time for the forward travel.

This allows the combine harvester 1 to immediately stop because the backward autonomous travel of the combine harvester 1 is more urgent to stop due to poor visibility and less safety than the forward autonomous travel.

In the combine harvester 1 of the present embodiment, the autonomous travel allowance switch 34 is placed on the handrail part 33 in front of the armrest 32 of the maneuvering part 9 of the combine harvester 1.

This allows the worker to operate the autonomous travel allowance switch 34 with his/her elbow resting on the armrest 32, thus making it possible to reduce the worker's burden to operate the combine harvester 1 to execute the autonomous travel. Further, the worker can operate the autonomous travel allowance switch 34 in a state of gripping the handrail part 33, thus making it possible to ensure the worker's safety during the autonomous travel.

In the above embodiments, the example has been described in which the armrest 32 and the handrail part 33 are provided on the right side of the drive seat 28, and the autonomous travel allowance switch 34 is provided at the handrail part 33 on the right side; the present invention is, however, not limited to this example. For example, in another example, the armrest 32 and the handrail part 33 may be provided on the left side of the drive seat 28, and the autonomous travel allowance switch 34 may be provided at the handrail part 33 on the left side. Or, in another example, the armrests 32 and the handrail parts 33 may be provided on both the left and right sides of the drive seat 28, and the autonomous travel allowance switches 34 may be provided on the handrail parts 33 on both sides.

Or, in the other example; in the cabin of the maneuvering part 9, the autonomous travel allowance switch 34 may be provided in a position other than the armrest 32 and handrail part 33 (for example, steering wheel 29 or main speed-change lever 30), or the autonomous travel allowance switch 34 may be provided on the mobile terminal 53.

Further, in the embodiment, plural autonomous travel allowance switches 34 may be provided at plural positions, such as the handrail part 33 on the right side, the handrail part 33 on the left side, the steering wheel 29, the main speed-change lever 30, the mobile terminal 53, and the like. In this case; when at least one of the autonomous travel allowance switches 34 is being pressed, the autonomous travel control part 62 executes the autonomous travel, that is, does not stop the autonomous travel. This can suppress the worker from unintentionally stopping the combine harvester 1.

Or, in the other embodiment; when the plural (for example, two) autonomous travel allowance switches 34 are provided at the plural (for example, two) positions such as the handrail part 33 on the right side, the handrail part 33 on the left side, the steering wheel 29, the main speed-change lever 30, the mobile terminal 53, and the like, the autonomous travel control part 62, when all of the autonomous travel allowance switches 34 are being pressed, executes the autonomous travel at the given set speed. Meanwhile, when at least one of the autonomous travel allowance switches 34 is pressed, the autonomous travel control part 62 executes the autonomous travel at the speed lower than the set speed. Further, when none of the autonomous travel allowance switches 34 is being pressed, the autonomous travel control part 62 stops the autonomous travel, that is, stops the combine harvester 1.

With this, the combine harvester 1 continues the autonomous travel at the low speed if any one of the autonomous travel allowance switches 34 is pressed by the worker; thus, the worker can calmly execute the operation, such as changing the drive conditions, without stopping the autonomous travel.

In the above embodiments, the example has been described in which the autonomous travel control part 62 executes the autonomous travel when the autonomous travel mode is set and the combine harvester 1 meets various autonomous travel start conditions thereby to have accomplished the autonomous travel enabled state, and when the autonomous travel allowance switch 34 is being pressed; the present invention is, however, not limited to this example. For example, in the other embodiment; the autonomous travel control part 62 may be so configured that, even when the autonomous travel enabled state is accomplished, the autonomous travel control part 62 executes the autonomous travel if the autonomous travel allowance switch 34 is being pressed after receiving a start instruction in response to the operation of the autonomous travel start button provided at the maneuvering part 9 or the mobile terminal 53.

Further, in the above embodiments, the example has been described in which the autonomous travel allowance switch 34 includes the press button; the present invention is, however, not limited to this example. For example, the autonomous travel allowance switch 34 may include a lever provided integrally with the handrail part 33 and steering wheel 29, and it may be so made that the worker grips the lever together with the handrail part 33 or the steering wheel 29 thereby to keep pressing the autonomous travel allowance switch 34.

For example, the mobile terminal 53 has the function to receive the start of the autonomous travel (autonomous mowing travel) of the combine harvester 1, and displays, on the touch screen, an autonomous travel execution screen having a start button of the autonomous travel. The autonomous travel execution screen, when the autonomous travel mode is set and the combine harvester 1 meets various autonomous travel start conditions, causes the start button to be operably displayed. In response to the operation of the start button of the autonomous travel execution screen, the mobile terminal 53 sends, to the combine harvester 1, an instruction to start the autonomous travel.

In the above embodiments, the example has been described in which the control device 50 of the combine harvester 1 functions as the farm field information setting part 60, the travel route creating part 61, the autonomous travel control part 62, and the autonomous mowing control part 63; the present invention is, however, not limited to this example. For example, in the other embodiment; it may be so configured that the mobile terminal 53 functions as the farm field information setting part 60, the travel route creating part 61, the autonomous travel control part 62, and the autonomous mowing control part 63. In other words, the autonomous driving system according to the present invention applies at least one of the control device 50 and mobile terminal 53 of the combine harvester 1, functioning as the farm field information setting part 60, the travel route creating part 61, the autonomous travel control part 62, and autonomous mowing control part 63, and the autonomous travel control part 62, when the autonomous travel allowance operation member such as the autonomous travel allowance switch 34 is being operated, may execute the autonomous travel which is based on the travel route.

In the above embodiments, the example has been described in which the work vehicle of the present invention includes the self-threshing type combine harvester 1; the present invention is, however, not limited to this example; the work vehicle of the present invention may include a passenger work vehicle such as an ordinary combine harvester, a tractor, a passenger mower, a passenger rice transplanter, a transport vehicle, a snowplow and a wheel loader, or an unmanned work vehicle such as an unmanned mower.

The present invention may be properly modified within the range not contrary to the gist or idea of an invention understandable from the claims and the entire specification, and the autonomous driving method, the work vehicle, and the autonomous driving system with the above modification are also included in the technical idea of the present invention.

DESCRIPTION OF REFERENCE NUMERALS

1 combine harvester (work vehicle)
2 travel part
9 maneuvering part
28 drive seat
29 steering wheel
30 main speed-change lever
32 armrest
33 handrail part
34 autonomous travel allowance switch (autonomous travel allowance operation member)
50 control device
51 storing part
53 mobile terminal
60 farm field information setting part
61 travel route creating part

62 autonomous travel control part
63 autonomous mowing control part

The invention claimed is:

1. A non-transitory computer-readable storage medium in a computer configured to execute an autonomous travel based on a preset travel route, comprising:
    an autonomous travel allowance operation member which allows for the autonomous travel;
    an autonomous travel control part for controlling the autonomous travel which is based on the travel route, wherein the autonomous travel control part executes the autonomous travel, which is based on the travel route, only while operating the autonomous travel allowance operation member, and
    only while the autonomous travel allowance operation member is being operated and the autonomous travel is being executed at a given set speed, and if the operating of the autonomous travel allowance operation member is canceled, the autonomous travel control part continues the autonomous travel at a speed lower than the set speed.

2. The non-transitory computer-readable storage medium in the computer according to claim 1, wherein
    the autonomous travel control part stops the autonomous travel after an elapse of a given duration time, rather than continuing the autonomous travel at a speed lower than the set speed.

3. The non-transitory computer-readable storage medium in the computer according to claim 2, wherein
    when an operation to change a drive condition is executed before the operation of the autonomous travel allowance operation member is canceled and the autonomous travel is stopped, the autonomous travel control part extends the duration time.

4. The non-transitory computer-readable storage medium in the computer according to claim 2, wherein
    the autonomous travel control part sets the duration time for a backward travel shorter than the duration time for a forward travel.

5. The non-transitory computer-readable storage medium in the computer according to claim 1, wherein
    only while at least one of a plurality of the autonomous travel allowance operation members provided at the work vehicle is being operated, the autonomous travel control part does not stop the autonomous travel.

6. A work vehicle that executes an autonomous travel based on a preset travel route, wherein a non-transitory computer-readable storage medium in a computer according to claim 1 is configured to be executed in the work vehicle.

7. The work vehicle according to claim 6, wherein
    the autonomous travel allowance operation member is placed on a handrail part in front of an armrest of a maneuvering part of the work vehicle.

8. An autonomous driving system including a work vehicle that executes an autonomous travel based on a preset travel route, wherein a non-transitory computer-readable storage medium in a computer according to claim 1 is provided in the autonomous driving system.

9. A non-transitory computer-readable storage medium in a computer, configured to execute an autonomous travel based on a preset travel route, comprising:
    an autonomous travel allowance operation member which allows for the autonomous travel;
    an autonomous travel control part for controlling the autonomous travel which is based on the travel route,

US 12,608,018 B2

17 wherein the autonomous travel control part executes the autonomous travel, which is based on the travel route, only while operating the autonomous travel allowance operation member, and only while the autonomous travel allowance operation member is being operated and the autonomous travel is being executed at a given set speed, and if the operating of the autonomous travel allowance operation member is canceled and a speed-increasing operation of the set speed is executed, the autonomous travel control part does not reflect the speed-increasing operation on the set speed, and after the autonomous travel allowance operation member is operated again, reflects the speed-increasing operation on the set speed.

10. A non-transitory computer-readable storage medium in a computer configured to execute an autonomous travel based on a preset travel route, comprising:

an autonomous travel allowance operation member which allows for the autonomous travel;

an autonomous travel control part for controlling the autonomous travel which is based on the travel route, wherein the autonomous travel control part executes the autonomous travel, which is based on the travel route, only while operating the autonomous travel allowance operation member, and the autonomous travel control part, when all of a plurality of autonomous travel allowance operation members provided at the work vehicle are being operated, executes the autonomous travel at a given set speed, while, when at least one but fewer than all of the plurality of the autonomous travel allowance operation members is being operated, executes the autonomous travel at a speed lower than the set speed.

* * * * *